FIG. 1

INVENTOR
ANGELO NATALIZIA
BY
David D. McKenney
ATTORNEY

March 23, 1971 A. NATALIZIA 3,572,383
PLUG VALVE WITH RESILIENT AND DEFORMABLE
PERIPHERAL LOBES ON VALVE MEMBER
Filed Sept. 13, 1968 7 Sheets-Sheet 2

INVENTOR
ANGELO NATALIZIA
BY
David D. McKenney
ATTORNEY

United States Patent Office 3,572,383
Patented Mar. 23, 1971

3,572,383
PLUG VALVE WITH RESILIENT AND DEFORMABLE PERIPHERAL LOBES ON VALVE MEMBER
Angelo Natalizia, Smithfield, R.I., assignor to Grinnell Corporation, Providence, R.I.
Filed Sept. 13, 1968, Ser. No. 759,548
Int. Cl. F16k 5/04, 5/18
U.S. Cl. 137—625.47
24 Claims

ABSTRACT OF THE DISCLOSURE

An inexpensive, simple but highly reliable and long life plug valve, which provides an excellent seal and is highly resistant to leakage even at sustained high temperatures but which is quite easy to turn, comprising a valve body, which has a generally cylindrical cavity with circumferentially spaced inlet and outlet ports and one or more circumferentially spaced longitudinal recesses or reliefs in the peripheral wall thereof, and a generally cylindrical valve member of a resilient and deformable material having a rigid stem embedded therein and one or more longitudinally extending resilient and deformable peripheral lobes. The peripheral cavity wall peripherally encloses the valve member and both are generally coaxial. The width, length and depth of the elongated recesses or reliefs are at least as great as the width, length and depth of the elongated lobes. The valve member rotates within the cavity, with the peripheral cavity wall acting as a bearing therefor, from a first position, in which the valve member is compressed laterally between the cavity wall with at least one of the lobes squeezed tightly against the cylindrical portion (seat) of the cavity wall around a port (preferably the downstream outlet port) to tightly seal the port, to a second position in which communication is provided between the ports through the valve and in which the lobe is rotated into the recess to thereby permit the lobe to become relaxed. The lobe peripheries and floors of the recesses are arcuate. The resilient and deformable lobes provide excellent sealing and the recesses for receiving the lobes facilitate assembling and turning of the valve member and minimize wear.

BRIEF SUMMARY OF THE INVENTION

The present invention relates to a plug valve of the type in which sealing to close the valve is achieved by pressing a resilient deformable material against a sealing surface when the valve is turned to close position.

A widely used commercial valve of this type embodies a spherical metallic valve member which rotates in a rubber seat member compressed and confined between the valve member and the wall of the cavity in the valve body. See U.S. Pats. Nos. 3,100,501; 3,168,900 and 3,223,111. However, these valves have the following disadvantages: (1) they are relatively expensive; (2) they tend to develop leaks after they have been in use for a period of time, particularly under sustained high temperature conditions, because the rubbery material of the valve seat expands and takes on a permanent changed set (loss of memory) at high temperatures and because plural paths of leakage are offered between the valve member and rubbery seat and between the seat and the cavity wall, which (3) increases maintenance and reduces reliability; (4) the rubber seat, compressed around the ball valve member at all times makes the valve member hard to turn throughout the range of rotation of such valve member and (5) causes excessive wearing to thereby decrease life.

U.S. Pat. No. 2,872,944 discloses another valve of this general type comprising a valve member of oblong cross-sectional shape, which is made up of a rigid core having a rubberlike covering and which rotates in a cylindrical cavity having two inlet and two outlet ports, the valve being a two way valve. The major cross-sectional axis of the valve member is oversized compared to the diameter of the cavity so that opposite sides of the valve member are pressed against the cavity wall at all times, sealing being accomplished by such opposite sides of the valve member being pressed against oppositely disposed inlet and outlet ports. This has the disadvantage that the valve member is difficult to turn throughout its range of rotation. If the major cross-sectional axis of the valve member is reduced to decrease resistance to turning, the valve is apt to leak. Because the valve member is at all times pressed against the cavity wall it wears out quickly, thereby requiring considerable maintenance.

Another valve of this general type which is being used commercially employs an eccentric metallic valve member journalled in the valve body at its ends to rotate in a cylindrical valve cavity. A port in the cavity wall is provided with a tapered, wedge-shaped valve seat drawn about an axis offset from the center axis of the cavity wall. The periphery of the eccentric portion of the valve member, which is provided with a ring-shaped groove containing a rubbery material, rides up and becomes wedged or cammed against the tapered seat to provide a seal when the valve member is turned. This type of valve is expensive and because sealing is achieved by a ring of relatively small cross section, a small amount of wear will result in early leakage.

Accordingly, there has long existed an unsatisfied need for an improved valve of this general type, which is less expensive, provides better sealing and hence greater resistance to leakage even at sustained high temperatures, has better wear properties and greater reliability, requires less maintenance and has a longer useful life than known valves of this general type but yet which is easy to turn and hence to operate.

The valve of the present invention fills this need.

Generally, it comprises a valve body which has a cavity with spaced inlet and outlet ports at least one of which is located in the peripheral wall of the cavity and a plug valve member rotatable in the cavity to control flow between the ports. The peripheral cavity wall peripherally encloses the valve member. The valve member is provided with at least one resilient and deformable peripheral sealing lobe and the peripheral cavity wall is provided with at least one recess or relief which is peripherally spaced from the port in the peripheral cavity wall and which is at least as deep as the normal relaxed height of the lobe. The peripheral cavity wall forms a bearing for rotation of the valve member therein from a first position in which the valve member is compressed laterally between the peripheral cavity wall with the sealing lobe squeezed tightly under compression against the portion (seat) of the peripheral cavity wall around the periphery of the port in such wall to provide an excellent seal, and to a second position, in which the sealing lobe is rotated into the recess and is thereby relaxed to facilitate rotation and insertion of the valve member in the cavity and to decrease wear. Preferably, the valve member is made of a resilient and deformable material with a rigid stem embedded therein, the valve member and cavity wall are generally cylindrical in shape and a plurality of such lobes and reliefs are provided around the periphery of the valve member and peripheral cavity wall, respectively.

In a preferred embodiment, the cylindrical valve member has two oppositely disposed arcuate peripheral lobes which give it a generally elliptical cross-sectional shape, the major axis of which is formed by the lobes. The valve member has a passage therethrough having a center axis coaxial with the minor cross-sectional axis of the ellipse, which is formed by the cylindrical portion of the valve member drawn about the center axis thereof. The cavity also has two oppositely disposed recesses or reliefs which give it a generally elliptical cross-sectional shape also, the major cross-sectional axis of which is formed by the reliefs. The ports are oppositely disposed with respect to each other in the cylindrical portion of the cavity wall drawn about the center axis thereof and forming the minor cross-sectional axis of the cavity so that the center axes of the ports are coaxial with the minor axis of the cavity ellipse. The major cross-sectional axis of the cavity ellipse is at least as great as the major cross-sectional axis of the valve member ellipse and the minor cross-sectional axes of both the cavity and valve member are about the same (i.e. the radii of the cylindrical portions of the valve member and valve cavity are about the same in magnitude) so that when the valve member is turned to a position in which the major cross-sectional axis thereof is coaxial with the major cross-sectional axis of the cavity and the minor cross-sectional axis thereof is coaxial with the minor cross-sectional axis of the cavity, the two lobes are received in the two recesses and are thereby relaxed, the cylindrical portion of the valve member is opposite the cylindrical portion of the cavity wall and the passage in the valve member is aligned with the ports in the cavity wall. However, the major cross-sectional axis of the valve member member ellipse is substantially greater than the minor cross-sectional axis of the cavity ellipse so that when the valve member is turned to a position in which the major axis thereof is coaxial with the minor axis of the cavity, the lobes are compressed between the cylindrical wall of the cavity in which the two oppositely disposed ports are located to provide a seal.

Other advantages and features of the invention will be apparent from the following description and accompanying drawings.

BRIEF DESCRIPTION OF THE DRAWINGS

In FIGS. 1–10 the numeral 2 represents a plug valve embodying the present invention and comprising (1) a valve body 4 having a cavity 5 with a bottom wall 38 integral with the valve body; (2) a plug valve member 6 made up of a molded resilient and deformable elastomeric material 8, such as synthetic nitrile rubber (one such rubber is sold under the name Hycar by B. F. Goodrich), which is inert to the fluids flowing through the valve and which has embedded therein a metal reinforcing stem 10 which protrudes upwardly out of the molded material into a cylindrical neck 12 having a milled flat 13 at its end, the valve member 6 being rotatable received and confined within the cavity 5 of body 4; (3) a cover plate 14 closing the cavity 5 and detachably attached to the top of the body 4 by means of two threaded screws 15 (FIG. 10), with the neck 12 of stem 10 extending upwardly through an aperture 16 in the cover plate; and (4) a handle 18 having an elongated slot 20 fitting over the flat 13 of the stem neck 12 and detachably attached to the stem 10 by means of a washer 24 and a threaded screw 26 threaded in a hole in the end of the neck 12 of stem 10.

The peripheral wall 28 of valve cavity 5 has a circular inlet port 30, communicating with an internally threaded inlet branch 32, and an oppositely disposed and axially aligned circular outlet port 34, communicating with an internally threaded outlet branch 36, the inlet and outlet ports being of the same diameter, which is smaller than the diameters of the bores of the inlet and outlet branches 32 and 36, respectively.

The peripheral cavity wall 28 has the general shape of a cylinder drawn about the longitudinal center axis $a$ (FIG. 9) and having a pair of oppositely disposed arcuate recesses or reliefs 40 and 42 therein, each of about the same size, each drawn about a center axis $b$ and $c$, respectively, and each running along the length of the cavity wall, to give the cavity a generally elliptical cross-sectional shape having a major axis $x$ and a perpendicular minor axis $y$. The center axes $b$ and $c$ of the elongated recesses or reliefs are equidistantly spaced from the center axis $a$ of the cavity along the cross-sectional major axis $x$. The minor cross-sectional axis $y$ is coaxial with the center axes of the two oppositely disposed and aligned ports 30 and 34 and the major cross-sectional axis $x$ is perpendicular to such center axes. Thus, the opposite portions 44 of the peripheral cavity wall 28 in which the ports 30 and 34 are located are cylindrical about the longitudinal center line $a$ of the cavity 5.

The circumferential width of each recess or relief 40 and 42 in the cavity wall 28 between the lines $d$ (FIG. 9) where each arcuate recess floor intersects the cylindrical wall portion 44 is substantially greater than the circumferential width of each of the ports 30 and 34 where they intersect the cylindrical wall portion 44 and is preferably about the same as the circumferential width of each of the cylindrical wall portions 44 between the lines $d$ and in which the ports are located.

Although the reliefs or recesses in FIGS. 1 to 10 are shown drawn about axes $b$ and $c$ off the center axis $a$, such reliefs can be drawn about the center axis $a$ using a radius greater than that of the cylindrical portions 44, with the ends of the arcs which are formed (these arcs form the floors of the recesses) being joined to the portions 44 by planes, e.g. at an angle of 60° to the center axes of the ports, which planes form the side walls of the reliefs.

The upper portion of the cavity 5 is increased in diameter at 46 to form a cylindrical recess in the cavity wall which is greater in diameter than the major axis $x$ of the main cavity and which forms a shoulder 48. The reliefs 40 and 42 extend from the intersection of enlargement 46 with the main portion of the valve cavity to the bottom of the cavity.

The top surface 50 of the valve body has a pair of oppositely disposed lugs 52, each having a threaded aperture 53 in which the screws 15 are threaded to secure the cover plate 14 to the body, as shown.

The molded valve member 6 also has the general shape of a cylinder drawn about the longitudinal center axis $e$ thereof (FIG. 8) and having a pair of oppositely disposed protruding peripheral arcuate lobes 54 and 56 of about the same size extending along the length thereof and drawn about the center axes $f$ and $g$, respectively, to provide a generally elliptical cross-sectional shape having a major axis $w$ and a perpendicular minor axis $z$. The center axes $f$ and $g$ are equidistantly offset from the center axis $e$ along the major axis $w$.

Figure 1:
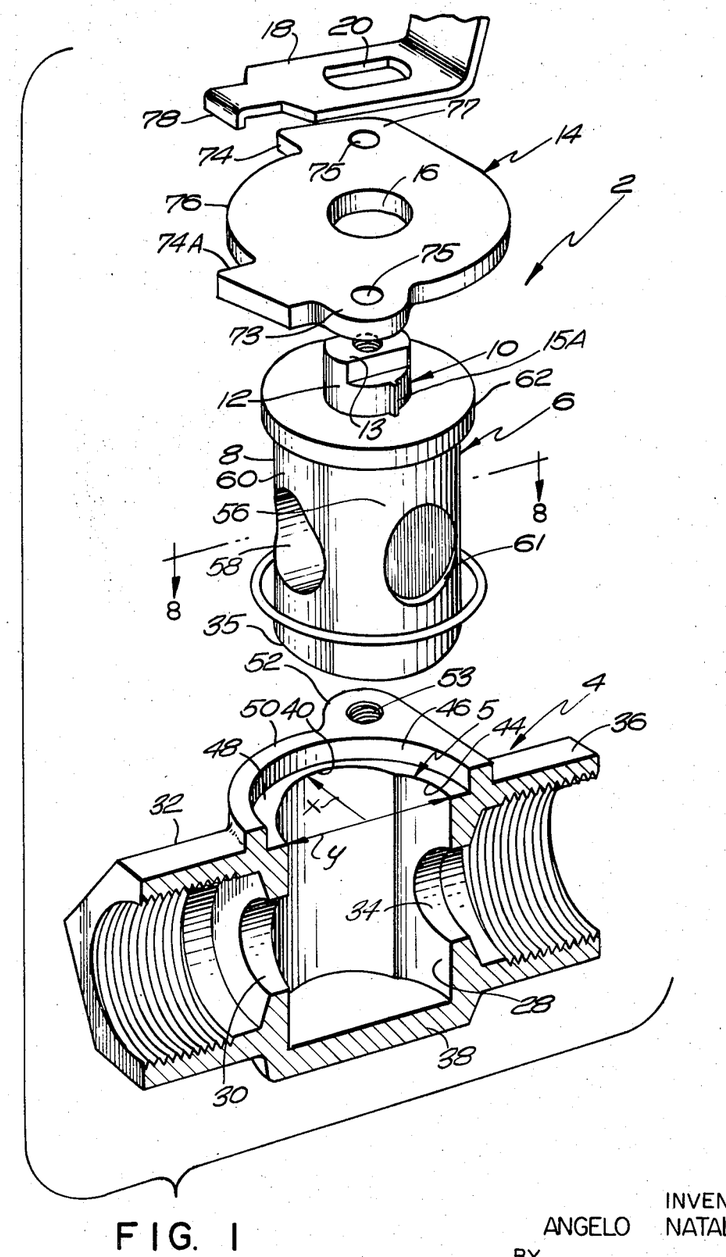
FIG. 1 is an exploded view in perspective and partially in section of a preferred embodiment of the invention.
Figures 2, 3:
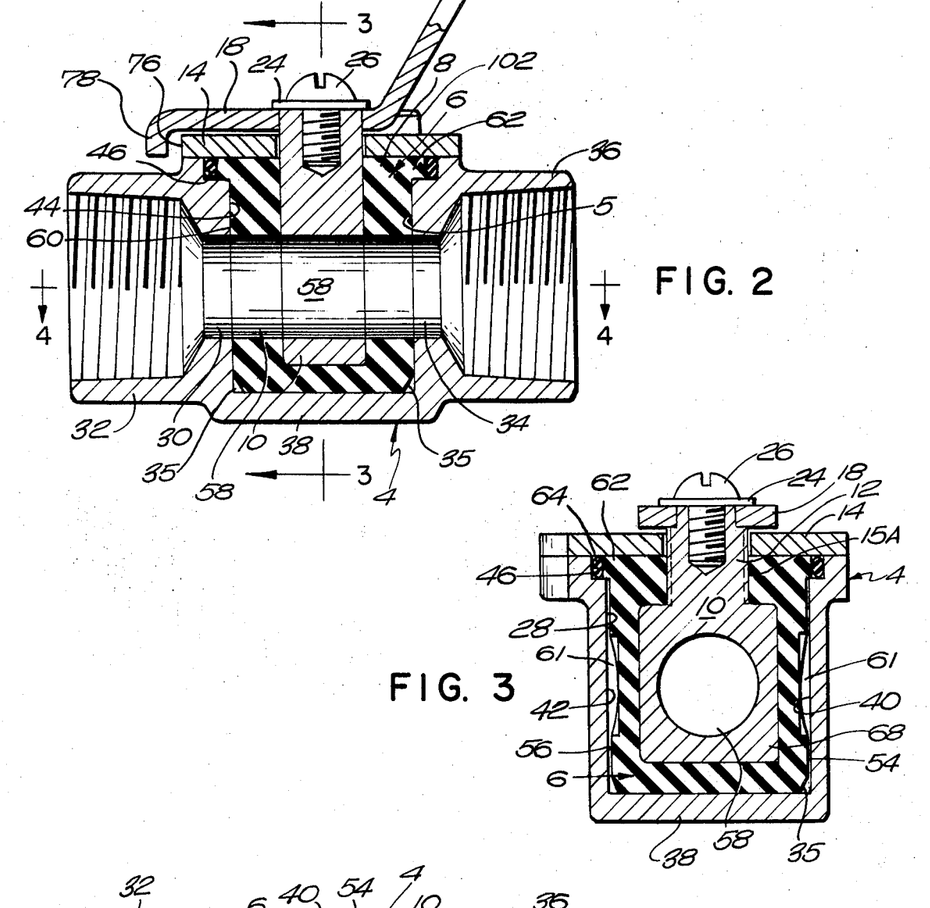
FIG. 2 is a section in elevation of the assembled valve of FIG. 1 showing the valve member in open position.
FIG. 3 is a view in section taken along the lines 3—3 of FIG. 2.
Figure 4:
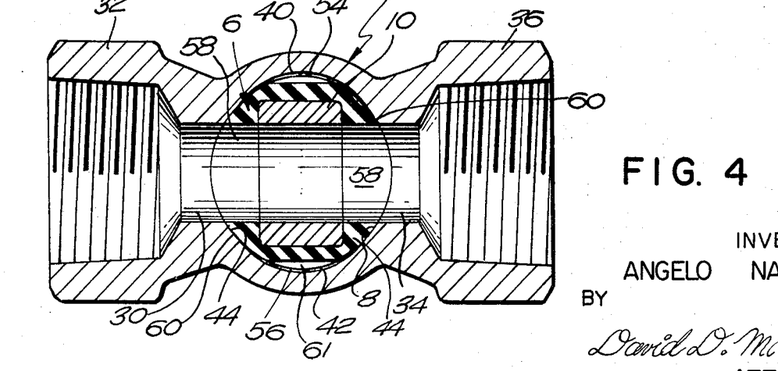
FIG. 4 is a view in section taken along the line 4—4 of FIG. 2.

The valve member 6 has a straight lateral passage or hole 58 which extends therethrough and which is coaxial with the minor cross-sectional axis $z$ thereof and perpendicular to the major axis $w$ thereof. Thus the ends of the hole 58 are located in the cylindrical portions 60 of the periphery of the valve member. The diameter of the hole 58 is about the same as the diameter of the ports and the hole is located lengthwise of the valve member so that when the valve member is rotated about its center axis $e$ in cavity 5 to open position as shown in FIGS. 2 to 4, it is axially aligned with the ports 30 and 34.

Figure 5:
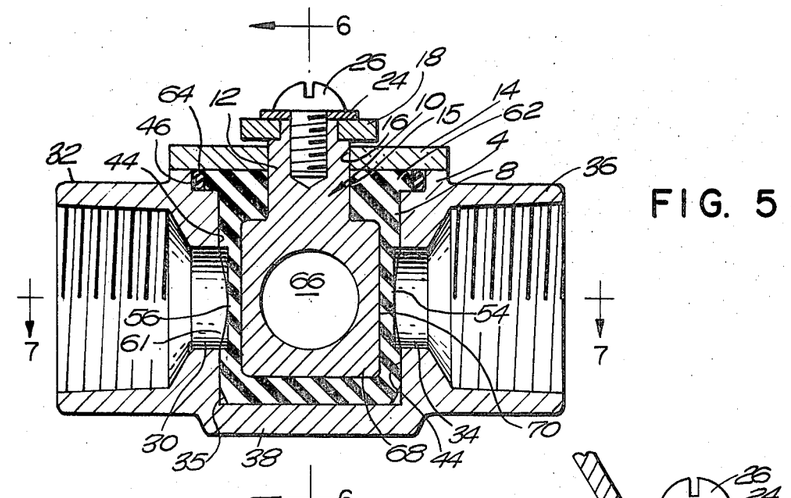
FIG. 5 is a view like FIG. 2 showing the valve member in close position.
Figure 6:
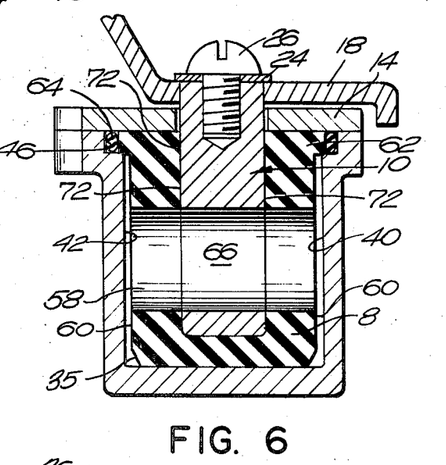
FIG. 6 is a view in section taken along the line 6—6 of FIG. 5.
Figure 7:
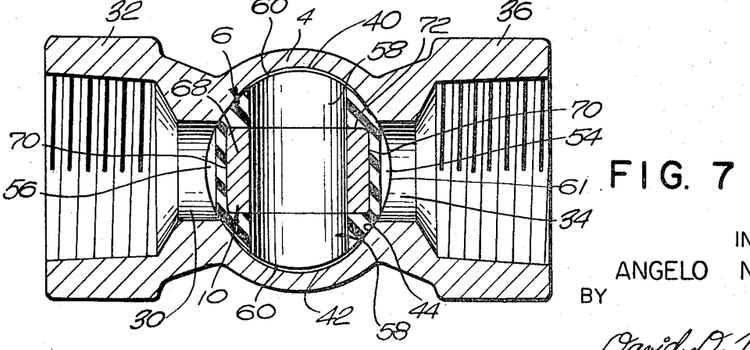
FIG. 7 is a view in section taken along the line 7—7 of FIG. 5.
Figure 8:
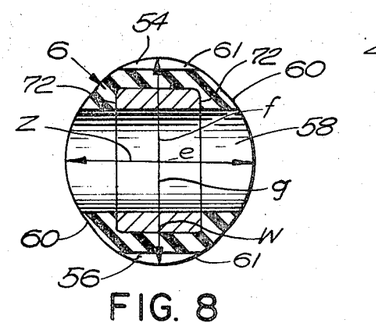
FIG. 8 is a view in plan and in section of the valve member of FIG. 1.
Figure 9:
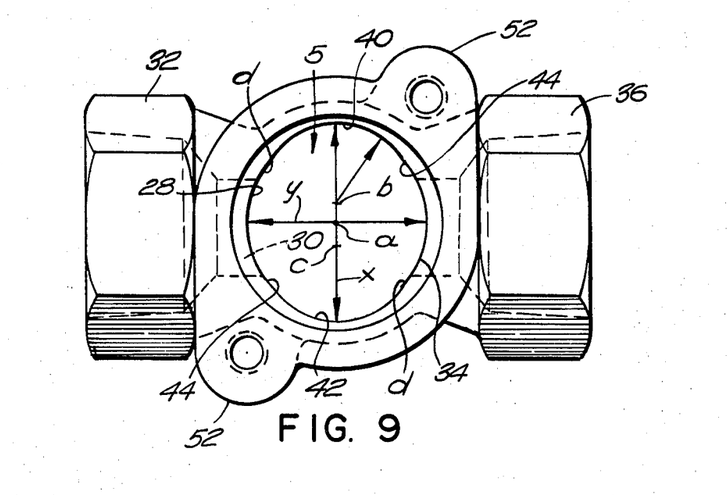
FIG. 9 is a top view in plan of the valve body of FIG. 1.
Figure 10:
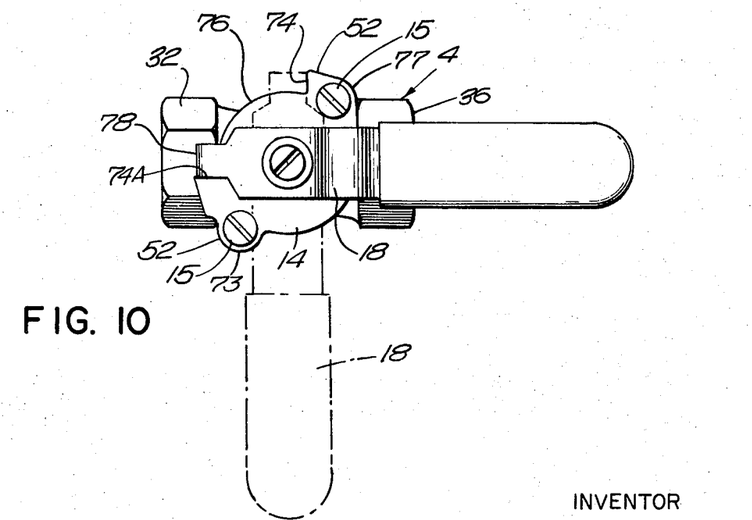
FIG. 10 is a top view in plan of the valve of FIG. 1 showing the handle for turning the valve member in full lines when the valve is open, as in FIGS. 2–4, and in broken lines when the valve is closed, as in FIGS. 5–7.

The apex of each lobe 54 and 56 is provided with a circular shallow recess 61 having a diameter about equal to the diameter of the hole 58 and the diameters of ports 30 and 34. The recesses 61 are located at the same height as the hole 58 so that when the valve member 6 is rotated in cavity 5 about its center axis $e$ to closed position in which the resilient and deformable lobes 56 and 54 are squeezed in compression against the cylindrical cavity wall portions 44 surrounding the peripheries of ports 30 and 34, respectively, to seal such ports, as shown in FIGS. 5 to 7, they (the recesses 61) are aligned with and are located over the ports 30 and 34.

The lower edge of the valve member 6 is beveled at 35 to facilitate insertion of the valve member 6 into the cavity.

The upper end of the valve member 6 has an outwardly extending lip or flange 62 received in the enlargement 46 at the upper end of the cavity wall 28. The lobes 54 and 56 extend from the underside of lip 62 to the bottom of the valve member.

An O ring 64 is located between the peripheral wall of the enlargement 46 and the periphery of the lip 62 to provide a seal.

The metal, e.g. brass, stem 10 comprises a body portion 68 consisting of a thick flat plate, which is wider than it is thick, the plane of which is perpendicular to the hole 58 in the valve member, the width of which extends in the direction of the major cross-sectional axis of the valve member, which has a hole 66 therein forming part of the hole 58 and which extends upwardly into the neck 12. Neck 12 is of circular cross-sectional shape and may have oppositely disposed ribs 15A extending longitudinally along the length of the periphery thereof. The resilient deformable material is molded around and bonded to the stem. The thickness of the resilient and deformable material 8 opposite the edges 70 (FIG. 7) of body portion 68, i.e. at the lobes 54 and 56, is less than the thickness thereof opposite the faces 72 (FIG. 6) of such body portion, i.e. at the cylindrical portions 60 of the valve member, to thereby provide maximum reinforcement of the lobes 54 and 56 while still permitting adequate deformation thereof and of the rest of the resilient deformable material of the valve member when the valve member is rotated to the position shown in FIGS. 5 to 7 to compress and deform the lobes between the opposite cylindrical portions 44 of the valve cavity surrounding the ports 30 and 34.

The hole 16 in the flat cover plate 14 is slightly larger than the cross-sectional diameter of the stem neck 12 passing through and rotatable in such hole.

The height of the valve member 6 below the flange 62 is the same or less (by making it less, the floor of the cavity need not be machined, the vertical support of the valve member being provided by the machined shoulder 48 of the valve cavity) than the height of the cavity 5 below the enlargement 46 thereof and the height of the flange 62 of the valve member is the same or slightly less than the height of enlargement 46 so that when the flat cover member 14 is screwed on the valve body and the valve member 6 is located in the open position shown in FIGS. 2 to 4 with the elongated lobes 54 and 56 relaxed in the elongated recesses or reliefs 40 and 42, respectively, and the hole 58 aligned with ports 30 and 34, the valve member 6, although fitting snugly in the cavity 5 at least at the cylindrical portions 60 and 44 thereof, respectively, is under no, or very little compression. However, the height of the valve member can be very slightly greater than that of the cavity, whereby the cover member compresses the valve member when it (the cover member) is secured in place. However, this has the disadvantage of increasing resistance to turning and wear.

The cover member is provided with two oppositely disposed peripheral lugs 73 and 77 having apertures 75 for receiving the screws 15 and with a pair of spaced shoulders or stops 74 and 74A, the edge 76 of the cover member between the shoulders being arcuate. The end of the handle 18 has a down-turned lip 78, which rotates around the edge 76 of the cover plate, which engages the shoulder 74A when the valve member 6 is in the open position shown in FIGS. 2 to 4 and which engages the shoulder 74 when the valve member 6 is in the closed position shown in FIGS. 5 to 7. This reduces the danger of underturning or overturning the valve member and conveniently indicates to the operator whether the valve is open or closed.

The diameter of the cylindrical portion 60 about the center axis $e$ of the valve member is about the same (it may be slightly greater or slightly less) as the diameter of the cylindrical portion 44 about the center axis $a$ of the cavity 5 so that the minor axes $z$ and $y$, respectively, of the valve member and cavity are about the same. Accordingly, when the valve member is in the open position shown in FIGS. 2 to 4 with the hole 58 axially aligned with the ports 30 and 34, the cylindrical areas 60 of the valve member, in which the ends of hole 58 are located, fit snugly against the cylindrical areas 44 of the valve cavtiy, in which the ports 30 and 34 are located. In this respect it is noted that the peripheral cavity wall 28 functions as a bearing for rotation of the valve member 6 in the cavity 5 between the open position shown in FIGS. 2 to 4 and the closed position shown in FIGS. 5 to 7 and that the center axis $e$ of the valve member is approximately coincidental with the center axis *a* of the cavity. Actually, the valve member does not have a fixed axis of rotation except to the extent that it is peripherally confined and enclosed by the peripheral cavity wall 28.

The cylindrical cavity wall portion 44 surrounding the periphery of each of the ports 30 and 34 comprises an arcuate valve seat against which the lobes 56 and 54 are tightly pressed and deformed when the valve is in the closed position shown in FIGS. 5 to 7, and such arcuate valve seats are generated about the longitudinal center axis of the cavity as well as about the longitudinal center axis of the valve member.

The depth of the recesses or reliefs 40 and 42 in the cavity wall 28 is slightly greater than the height of the lobes 54 and 56 (they may be the same) so that the major cross-sectional axis *x* of the cavity is slightly greater than that (*w*) of the valve member. Also the circumferential width of the recesses or reliefs 40 and 42 is slightly greater than the circumferential width of the lobes 54 and 56 (they may be the same) and the length of the lobes and cavity recesses in the direction of the longitudinal axes of the cavity and valve member are the same. Accordingly, when the valve is in the open position shown in FIGS. 2 to 4 in which the lobes 54 and 56 are received in the reliefs 40 and 42 (the major cross-sectional axis *w* of the valve member is coaxial with the major cross-sectional axis *x* of the cavity and the minor cross-sectional axis of the valve member is coaxial with the minor cross-sectional axes of the cavity), the lobes are not under compression and have their relaxed normal shape, i.e. they are relieved. Furthermore, since the diameters of the cylindrical portions 60 and 44 of the valve member 6 and cavity 5, respectively, which are located opposite each other in such open position, are about the same, these portions of the valve member are not under any substantial compression. Accordingly, resistance to rotation of the valve member in the cavity is minimized and insertion of the valve member in the valve cavity is facilitated.

However, the major axis *w* of the valve member is substantially greater than the minor axis *y* of the cavity and the width of the lobes 54 and 56 of the valve member is substantially greater than the diameter of the ports 30 and 34 so that when the valve member is turned from the open position shown in FIGS. 2 to 4, in which lip 78 of handle 18 engages stop 74A, to the closed position shown in FIGS. 5 to 7, in which lip 78 engages stop 74, the resilient and deformable lobes 54 and 56 ride up out of the cavity recesses 40 and 42 and are compressed and deformed laterally between the cylindrical portions 44 of the cavity wall surrounding the peripheries of the ports, i.e. the valve seats, and against such portions of the cavity wall to provide excellent seals for both ports. Actually, the entire valve member is placed under lateral compression between the valve seats to cause the rubbery material, particularly the lobes, to deform and flow against the cavity wall portions 44.

The pressure of the fluid at the inlet port 30 on the valve member 6 increases the force with which the lobe 54 is pressed against the valve seat 44 of the oppositely disposed outlet port 34 to thereby increase the sealing effect.

The rigid metal stem 10 not only functions to reinforce the valve member and to give rigidity and strength for turning the valve but it also limits maximum deformation thereof by the aforesaid compression forces and by the pressure of the fluid.

The function of the shallow recesses 61 in the lobes is to reduce the cutting and wearing action of the hard edges of the ports on the lobes where they are pressed together when the valve member is rotated to and from closed position. They do this by reducing the tendency of the material of the lobes to flow into the ports when the valve is closed. This tendency is not only harmful from the point of view of cutting and wearing but also when the valve is left closed for long periods of time the material of the lobes which flow into the ports takes on a permanent set which increases the diameter of the valve member and thereby makes turning of the valve member more difficult.

It is noted the only path for leakage is between the valve member 6 and the cavity wall 28. Also, because the circumferential width of the lobes is substantially greater than the diameter of the ports, a substantial circumferential sealing area is provided for each port. In fact, since the circumferential widths of the lobes are preferably about the same as the circumferential widths of the cylindrical cavity wall portions 44, substantially the entire circumferential width of the cylindrical portion 44 associated with each port constitutes a sealing area, that is, the compressed and deformed lobes are in contact with substantially the entire circumferential widths of cylindrical portions 44.

In this respect, since the circumferential widths of the lobes and cylindrical cavity wall portions, in which the ports are located, are substantial and are in sealing contact when the valve member is in close position, and since the lobes and such portions of the cavity wall are in sealing contact over the heights of the cavity and valve member when the valve member is in close position, a relatively large seal area is provided to achieve excellent sealing.

Also, because the circumferential widths of the lobes and of the cylindrical portions of the valve cavity, in which the ports are located, are preferably about the same, as soon as rotation of the valve member from close to open position is commenced, the lobes commence to rotate into the recesses to relieve them and thereby decrease resistance to rotation. The relief of the lobes and decrease in resistance to rotation continues until the valve member is moved to open position in which the lobes are entirely relieved. When the valve member is rotated to closed position, lobe compression and hence resistance to rotation continue to increase from zero until they reach a maximum in the closed position.

Thus, resistance to rotation of the valve member is reduced to a minimum over most of the range of rotation between close and open positions when sealing is not required and it is high only in the closed position in which tight sealing is required. In this way excellent sealing is achieved with minimum resistance to operation. For the same reason, wear of the valve member and cavity wall are reduced to a minimum to thereby reduce maintenance and increase the life and reliability of the valve. Also, for the same reason the major axis of the valve member can be made substantially larger than the minor axis of the cavity to thereby achieve greater compression and better sealing and greater resistance to leakage even at sustained high temperatures. With this type of construction the tendency of the rubber to take on a permanent set (lose its memory) particularly when subjected to sustained high temperatures (with the result that it does not recover its original shape and elasticity) does not cause leakage problems, as compared, for example, to a ball valve rotatable in a rubber valve seat compressed within the valve cavity.

The maximum major cross-sectional axis of the valve member is that beyond which the valve member becomes too difficult to turn to seal position. The minimum major cross-sectional axis is that below which compression of the resilient deformable lobes is insufficient to provide good sealing. Excellent results have been achieved with a valve in which the interference between the lobes and valve seats in close position, i.e. the distance by which the major cross-sectional axis of the valve member exceeds the minor cross-sectional axis of the cavity, is between .018 and .025 inch, and in which the clearance between the lobes and floors of the reliefs in open position, i.e. the distance by which the major cross-sectional axis of the cavity exceeds the major cross-sectional axis of the valve member, is between zero and .012 inch. However, the invention is not limited to any particular interferences or clearances.

It is apparent that the valve disclosed in the drawings is quite simple, rugged and inexpensive.

Any resilient, deformable material conventionally used in this general type of valve may be used so long as it is inert to the fluids passing through the valve. Rubbers including natural rubber, and resins of various types, such as Teflon, Kel-F, etc., can be used.

The cylindrical valve seat portions 44 of the cavity should be smoothly finished in order to reduce wearing of the valve member. However, the recesses or reliefs 40 and 42 in the cavity wall need not be since the valve member does not contact these surfaces under compression.

Certain advantages of the invention may be achieved by using the same valve body with a valve member like that shown in the drawings except that its entire periphery is cylindrical about its center axis $e$ with no peripheral lobes, the diameter of the cylindrical valve member being of a dimension somewhere between the dimensions of the major cross-sectional axis and minor cross-sectional axis of the cavity. Although this construction would not have many of the advantages of the construction shown in the drawings, nevertheless, it would have the advantages that the relieved portions or recesses in the cavity wall reduce the force required to insert the valve member in the valve cavity and the opposed sealing portions of the valve member, which seal the ports, are relaxed in the cavity recesses when the valve is open and become compressed only when the valve is closed, to thereby reduce resistance to rotation of the valve member, as compared to use of the same valve member with an entirely cylindrical shaped undersized cavity, i.e. one without recesses or relieved portions having a diameter equal to the minor cross-sectional axis of the cavity disclosed in the drawings.

FIGS. 11 to 18 show another embodiment of the invention incorporated in a three way alarm and test valve for use with a sprinkler system to connect the alarm with a dry pipe valve and a source of water under pressure for testing.

In these figures, the numeral 90 designates the alarm and test valve made up of a valve body 92, having a generally cylindrical shaped valve cavity 94, a generally cylindrical valve member 96 made up of the same resilient and deformable material as the valve member of FIGS. 1 to 10 and having embedded therein a rigid metallic stem 98, a cover plate 100 detachably secured to the valve body by means of two threaded screws 102 with a cylindrical neck portion 104 of stem 98 extending upwardly through an aperture therein, and a handle 106 like that in FIGS. 1 to 10 secured over and to a flat 105 at the end of the neck portion 104 of the stem by means of a washer 108 and a threaded screw 110 threaded into a hole in the end of the stem.

In this embodiment the cavity wall 94 has three ports of about the same size equidistantly spaced around the periphery of the cavity wall 120° apart, namely a first port 112 communicating with an internally threaded branch 114 for connection with the sprinkler alarm (not shown), a second port 116 communicating with an internally threaded branch 118 for connection with a dry pipe valve (not shown), and a third port 120 communicating with an internally threaded branch 122 for connection with a source of water under pressure to test the alarm.

As aforesaid, the cavity wall has the general shape of a cylinder drawn about the center axis $h$ with two elongated arcuate, circumferentially spaced reliefs or recesses 124 and 126 therein of about the same size extending the length thereof and located on either side of port 120, relief 124 being located about midway between ports 120 and 112 and relief 126 being located about midway between ports 120 and 116. Actually, these reliefs have the appearance of elongated arcuate grooves in the cavity wall. These arcuate reliefs 124 and 126 are drawn about the center axes $i$ and $j$, respectively, which are equidistantly spaced from center axis $h$, the axis $i$ intersecting an extension of the center axis of port 116 and the axis $j$ intersecting an extension of the center axis of port 112.

Each of the ports 112, 116 and 120 is located in the cylindrical portion 128 of the cavity wall about center axis $h$ and such cylindrical portion of such wall surrounding the periphery of each port comprises a valve seat generated about the center axis $h$ of the cavity 94.

The cavity has a bottom wall 130 integral with the valve body and is enlarged at 132 at its upper end. The reliefs 124 and 126 extend from the intersection of enlargement 132 with the main portion of the cavity to the bottom of the cavity. The circumferential width of each of the reliefs between the lines of intersection thereof with the cylindrical cavity wall is about the same as the circumferential width of the cylindrical cavity wall portion 128 in which the port 120 is located.

The valve member 96 has the general shape of a cylinder drawn about the center axis $l$ of the valve member and having three spaced elongated peripheral arcuate lobes 134, 136 and 138 of about the same size clustered side by side and extending along the length of the valve member from the underside of the outwardly extending flange or lip 140 at the upper end thereof to the bottom of the valve member. The arcuate peripheries of these lobes are drawn around center axes $m$, $n$ and $o$ (FIG. 14) equidistantly spaced from the center axis $l$ of the valve member, which is approximately coincidental with the center axis $h$ of the cavity when the valve member 96 is located in the cavity 94 since the radius of the cylindrical portion 150 of the valve member from which the lobes extend is about the same as that of the cylindrical portion 128 of the cavity.

Figure 11:
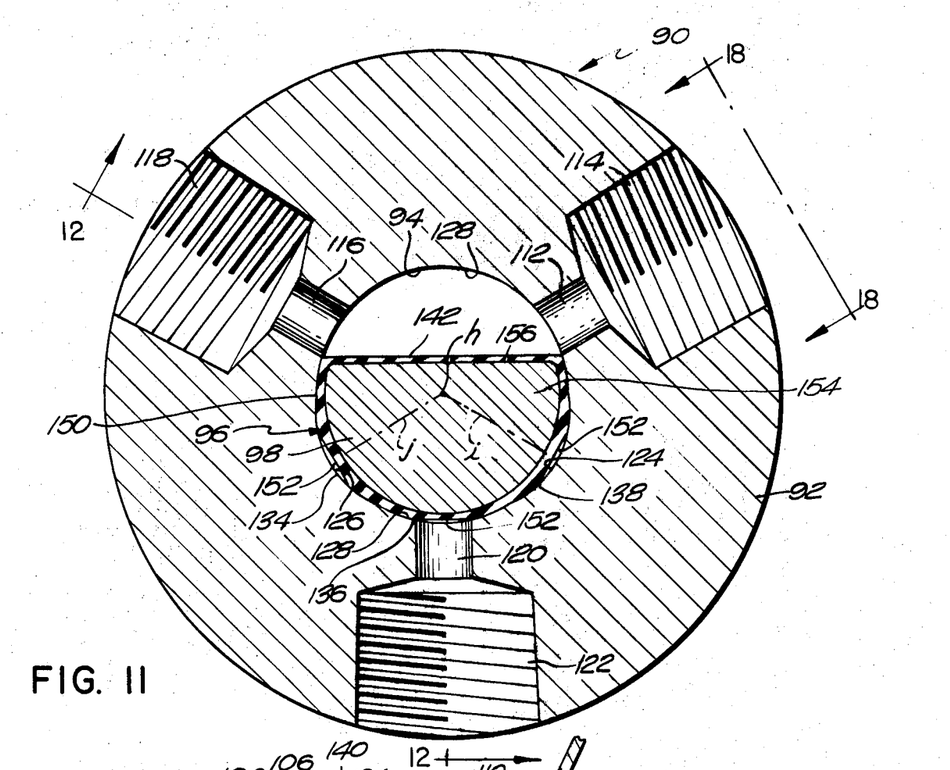
FIG. 11 is a section in plan of another embodiment of the invention employed in an alarm and test valve for connection with a dry pipe valve, and alarm and a source of water for testing the alarm in a sprinkler system.

When the valve is in the position shown in FIG. 11 with dry valve port 116 in communication with the alarm port 112, the center axis $m$ of lobe 134 intersects an extension of the center axis of port 112 and coincides with or is close to the center axis $j$ of relief 126, the center axis $n$ of lobe 136 intersects an extension of the center axis of port 120 and the center axis $o$ of lobe 138 intersects an extension of the center axis of port 116 and conicides with or is close to the center axis $i$ of relief 124. Accordingly, the center axes $m$, $n$ and $o$ of the lobes are angularly and equidistantly spaced from each other around the center axis $l$ of the valve member about the same distance that the center axes of the ports and the center axes $i$ and $j$ of the reliefs 124 and 126 are spaced from each other about center axis $h$ of the cavity.

The depth of the reliefs 124 and 126 is equal to or slightly greater than the height of the lobes. Also the widths of the reliefs are about the same or slightly greater than the widths of lobes. Since the length of the lobes and reliefs are the same it may be seen that when a lobe is received in a relief it is not under any substantial compression and hence takes on its relaxed normal shape.

However, the distance, from the center axis of the cavity, of the peripheries of the lobes in their relaxed normal condition is substantially greater than the radius of the cylindrical portions 128 of the cavity wall in which the ports are located and the circumferential width of the lobes is substantially greater than the circumferential width of the ports. In fact, the circumferential width of the lobes is about the same as the circumferential width of the cylindrical portion 128 of the cavity wall in which port 120 is located (i.e., the cylindrical portion 128 of the cavity wall between reliefs 124 and 126). Accordingly, it may be seen that when the valve member is rotated to move a lobe opposite a cylindrical portion of the cavity wall in which a port is located, the lobe is deformed and compressed tightly against such cylindrical portion (valve seat) around the port to seal the port. Since the circumferential widths of the lobes and cylindrical portions of the cavity wall, in which the ports are located, are substantial and since the lobes are in sealing contact with such cylindrical portions over the heights of the cavity wall and valve member, it may be seen that the sealing area is substantial to provide an excellent seal.

It is noted that the arcuate peripheries of adjaecnt lobes intersect each other at 146 at lines parallel to the center axis of the valve member but spaced a slightly greater radial distance from the center axis $l$ than the cylindrical portion 150 of the valve member, when such member is in its relaxed normal condition. Because of this and because of the clustering of the lobes at one side of the valve member, the center axis of the valve member in the cavity may be spaced slightly from the center axis of the cavity. However, the intersection lines 146 may be spaced radially from center axis $l$ the same distance as the cylindrical portion 150 of the valve member.

Figure 12:
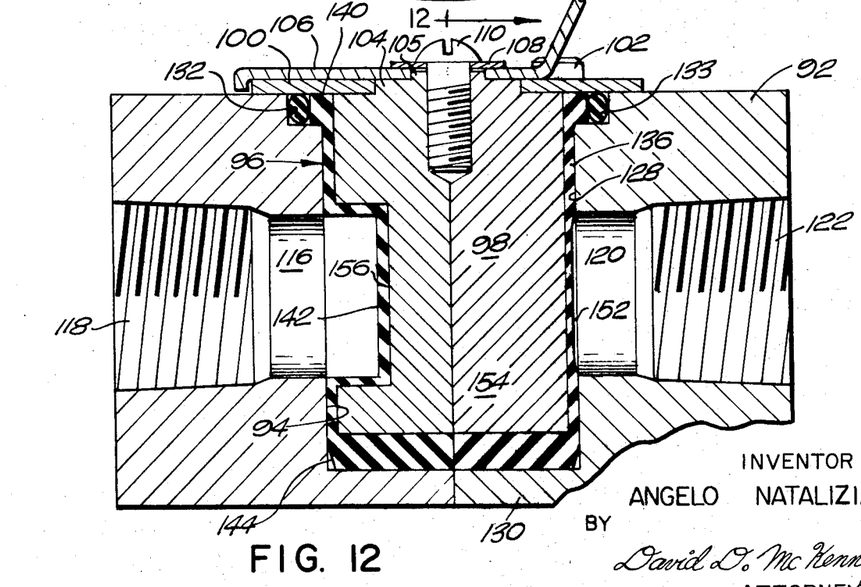
FIG. 12 is a section taken along the line 12—12 of FIG. 11 with portions cut away.
Figure 13:
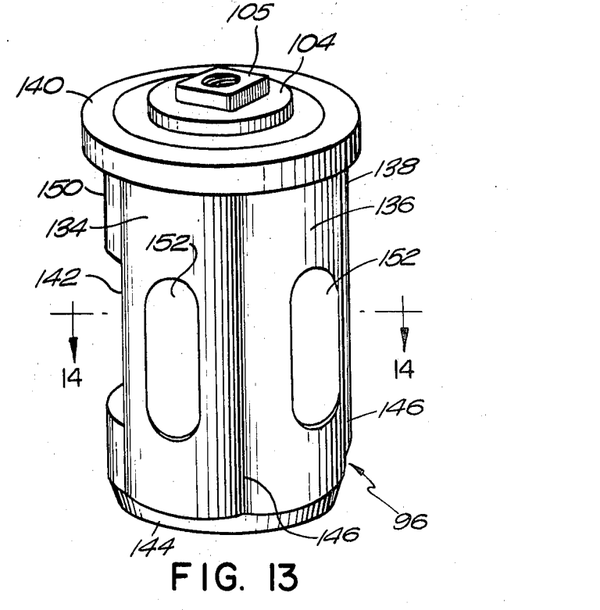
FIG. 13 is a view in perspective of the valve member of FIG. 12.
Figure 14:
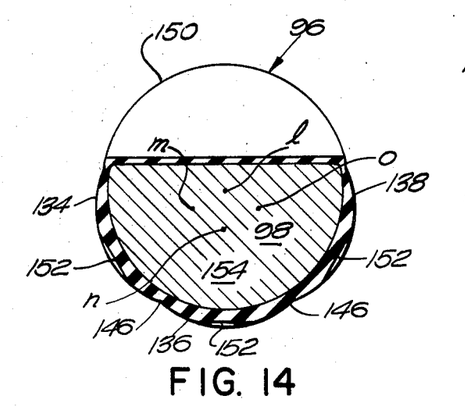
FIG. 14 is a section in plan taken along the line 14—14 of FIG. 13.
Figure 18:
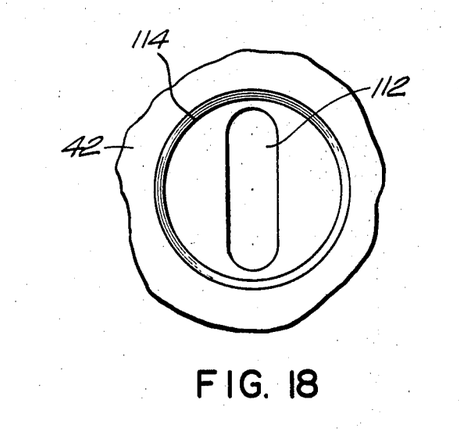
FIG. 18 is a view taken along the line 18—18 of FIG. 11.

The side of the valve member 96 opposite the three side-by-side lobes has a slot 142 in the periphery thereof intermediate the upper and lower ends thereof and the lower end of the valve member is bevelled at 144. The vertical height of slot 142 is about the same as the vertical height of the ports 112, 116 and 120, as shown in FIG. 12, the ports being vertically elongated, as shown in FIG. 18. The radii of the three lobes 134, 136 and 138 are about the same or slightly less than the radii of the reliefs 124 and 126 so that the curvature of the lobes and reliefs is about the same. Accordingly, when the valve member is turned the arcuate lobes ride up or down the arcuate sides of the reliefs.

The apex of each lobe is provided with a shallow recess 152 having about the same shape as the ports and located lengthwise of the valve member so that when the lobes are rotated against the ports, they are aligned with the ports, as shown in FIG. 12.

The main body portion 154 of the stem 98 is semicircular in cross-sectional shape with the flat side 156 located behind the slot 142 and the arcuate periphery thereof located behind the lobes, as shown in FIG. 11. The main body portion 154 extends upwardly into the neck 104 of circular cross-section which protrudes upwardly through and is rotatable in the cover plate 100, as aforesaid.

The flange or lip 140 of the valve member is received in the enlargement 132 of the cavity, as shown in FIG. 12, the height of the lip being about the same as or less than the height of the enlargement 132. The height of the valve member below the lip is also the same as or less than the height of the cavity below the enlargement 132.

An O-ring 133 is located between the lip and peripheral wall of the enlargement to provide a seal for the cavity.

Since the height of the valve member is the same as or less than the height of the cavity, the cover plate does not serve to substantially compress the valve member.

Figure 15:
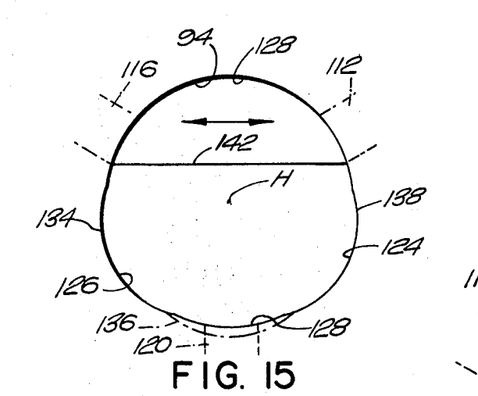
FIG. 15 is a diagrammatic view in plan of the valve of FIGS. 11–14 showing the valve member in a first position shown in FIG. 11 in which the port leading to the dry pipe valve is placed in communication with the port to the alarm and the port to the water source is sealed by a compressed lobe, the relaxed normal shape of the compressed lobe being shown in broken lines.
Figure 16:
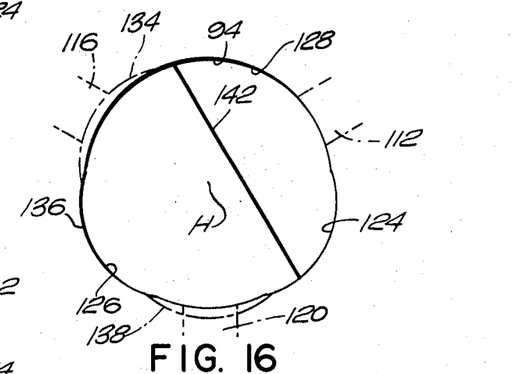
FIG. 16 is a view like FIG. 15 showing the valve member in a second position in which both the dry pipe valve port and the water port are sealed by compressed lobes, the relaxed normal shapes of such lobes being shown in broken lines.
Figure 17:
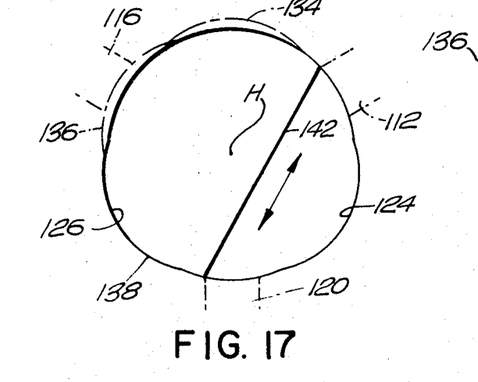
FIG. 17 is a view like FIG. 15 showing the valve member in a third position in which the water port is in communication with the alarm port and the dry pipe valve port is sealed by a compressed lobe, the normal relaxed positions of the compressed lobes being shown in broken lines.

The cover plate 100 is the same as the cover plate of FIGS. 1 to 10 except that the stops 74 and 74A are spaced further apart to accommodate the greater rotation (120°) required to rotate the valve member from the normal position shown in FIG. 15 to the test position shown in FIG. 17 with a mark or spring detent being provided on the cover plate to indicate when the valve is in the intermediate off positions shown in FIG. 16.

As in FIGS. 1 to 10, the peripheral cavity wall 128 acts as a bearing for rotation of the valve member between the three positions shown in FIGS. 15, 16 and 17. Also, as in FIGS. 1 to 10, the cylindrical portions of the cavity wall in which the ports are located, i.e. the valve seats, are generated by a radius from the center axis of the cavity.

The three positions of the valve member are as follows:

The first normal position is shown in FIG. 15. In this position, the slot 142 is in registry with the ports 112 and 116 to provide communication between such ports and hence between the dry pipe valve and the alarm. In this position the lobe 138 is received in the relief 124 and the lobe 134 is received in the relief 126 so that these lobes are in their normal relaxed condition. However, lobe 136 is compressed and deformed tightly against the cylindrical portion of the peripheral cavity wall around the periphery of water port 120 to provide a tight seal. This is the normal position of the valve.

The second off position is shown in FIG. 16 in which none of the ports are in communication with each other. The slot 142 is opposite the port 112 and the lobe 136 is rotated into relief 126 so that it is relaxed. However, lobe 134 is deformed and compressed tightly against the cylindrical peripheral cavity wall portion around the periphery of dry valve port 116 to form a tight seal and lobe 138 is deformed and compressed tightly against the cylindrical peripheral cavity wall portion around the periphery of water port 120 to form a tight seal. In moving from the first to the second positions, lobe 134 is moved out of relief 126 to a compressed condition over the port 116 to seal it, lobe 136 is moved from a compressed condition over the port 120 to a relaxed condition in relief 126 and lobe 138 is moved out of its relief 124 to a compressed condition over the port 120 to seal it.

In the third test position shown in FIG. 17, the slot 142 is in registry with the water port 120 and the alarm port 112 to provide communication therebetween and hence between the source of water and the alarm to thereby test the alarm. Lobe 138 is moved from its compressed condition over port 120 into the relief 126 to thereby relieve the lobe. Lobe 136 is moved out of relief 126 to a compressed condition over the port 116 to seal it and lobe 134 is deformed and compressed against a cylindrical portion 128 of the cavity wall.

Figure 19:
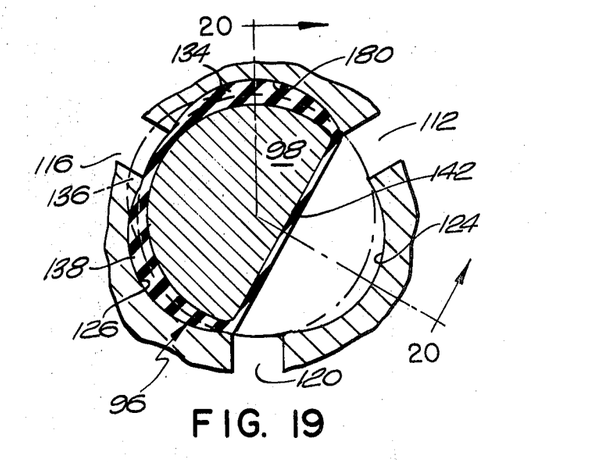
FIG. 19 is a section in plan with portions broken away of a valve like that of FIG. 11, with the valve member in the same position as in FIG. 17, except for the addition of a third recess in the cavity wall for receiving a lobe in that position.
Figure 20:
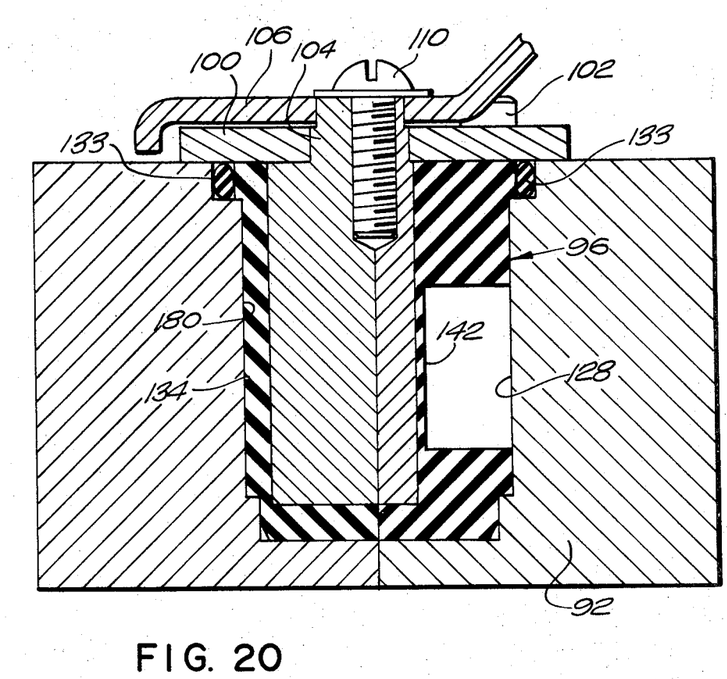
FIG. 20 is a section taken along the line 20—20 of FIG. 19.

FIGS. 19 and 20 disclose an alarm and test valve like that shown in FIGS. 11 to 18 except that a third elongated arcuate relief or recess 180 is provided in the cavity wall about midway between ports 112 and 116 to receive the lobe 134 when the valve member is in the test position of FIG. 17 and all three of the lobes as well as all three of the reliefs terminate short of the lower ends of the valve member and cavity wall, respectively, as shown in FIGS. 19 and 20.

In the FIG. 11 to 18 arrangement, the third relief 180 is omitted at the expense of increased resistance to turning because in the FIG. 15 and FIG. 16 positions the upstream water (under pressure) port is sealed. Accordingly, if the third relief 180 is provided to thereby permit greater flow and deformation of the valve member, the pressure of the water is apt to deform the valve member too much in these positions to cause leakage, i.e. there may not be enough total compression of the valve member by the cavity wall. However, in the embodiment of FIGS. 19 and 20, by terminating all the reliefs and lobes short of the bottom of the cavity wall and valve member, respectively, better support is achieved at the lower portion of the valve member to thereby permit the use of the third relief 180 without danger of leakage.

In the FIG. 19–20 embodiment, the cylindrical portions (valve seats) of the cavity wall in which the ports 112 and 116 are located, i.e. the cylindrical portions between reliefs 124 and 180 and between reliefs 180 and 126 have about the same circumferential width as the lobes. In this way maximum seal areas are achieved and each lobe is fully compressed only in seal position.

A search of the prior art revealed in addition to the aforesaid patents, the following patents: French Pat. No. 1,111,699 and U.S. Pats. Nos. 3,038,694; 2,274,731; 2,566,885; 2,075,459; and 3,089,626, none of which are pertinent. Also, enclosed herewith is a copy of Bulletin 111 by Dezurik Corporation, Sartell, Minn., U.S.A.

A typical dry pipe valve with which the embodiments of FIGS. 11 to 20 is connected is shown and described in U.S. Pat. No. 1,591,924.

The invention is not intended to be limited to the particular embodiments thereof illustrated and described above but only by the following claims and their equivalents.

I claim:

1. A valve comprising a body with a valve cavity having at least one inlet port and at least one outlet port spaced from each other with said ports being in the peripheral wall of said cavity and a plug valve member rotatable in said cavity to open and close flow from said inlet port through said valve to said outlet port, said cavity wall peripherally enclosing said valve member, said valve member having at least two peripheral lobes of a deformable resilient material, said peripheral wall of said cavity having at least two recesses which are circumferentially spaced from each other and from said ports in said cavity wall and which are at least as deep as the normal relaxed height of said lobes, said valve member being rotatable from a first position, in which it is compressed laterally between the peripheral cavity wall with the lobes squeezed tightly under compression against the cavity wall portion around the periphery of said ports respectively in said wall to seal both said ports when said valve member is in said first position, and to a second position, in which said lobes are located in said recesses respectively and are thereby relaxed to facilitate rotation of the valve member in the cavity.

2. A valve according to claim 1, said cavity wall forming a bearing surface for said rotation of said valve member.

3. A valve according to claim 1, said inlet port being located in said peripheral cavity wall at a position with respect to said outlet port in which pressure on said valve member by fluid at said inlet port is effective to increase the force with which said lobe is pressed against said portion of said cavity wall having said outlet port to thereby increase said seal.

4. A valve according to claim 1, the upper end of said cavity being peripherally enlarged, the upper end of said valve member having an outwardly extending flange located in said enlargement in said cavity, sealing means between said flange and the wall of said enlargement, said body forming a bottom wall of said cavity with the axial length of said cavity from said enlargement to said bottom wall being at least as great as the axial length of the valve member from said flange to the bottom of said valve member, and a cover plate detachably attached to the top of said body over said cavity to close said cavity and confine said valve member therein, said valve member being made of said resilient deformable material having a reinforcing stem embedded therein, said stem extending upwardly through said cover plate and having a handle attached thereto to rotate said valve member.

5. A valve according to claim 1, said ports being said inlet and outlet ports, said lobes being oppositely disposed on the periphery of said valve member, said recesses being oppositely disposed in said periphery cavity wall and said inlet port and outlet port being oppositely disposed in said peripheral cavity wall.

6. A valve according to claim 5, said ports being located about 90° circumferentially around said peripheral cavity wall from said recesses, said valve member having a passage therethrough the openings of which are oppositely disposed in the periphery of said valve member and are located about 90° circumferentially around said last mentioned periphery from said lobes, whereby the valve member is rotatable in said cavity from said first position, in which said passage through said valve member is aligned with said ports to open the valve and in which said lobes are located in said oppositely disposed recess and are thereby relaxed, to said second position in which said oppositely disposed lobes are compressed between oppositely disposed portions of said peripheral cavity wall located around the peripheries of said ports, whereby said lobes are squeezed tightly against said cavity wall portions to thereby seal each of said ports and close the valve.

7. A valve according to claim 6, said valve member being made of said resilient deformable material having a relatively rigid stem embedded therein, the cross-section of said valve member having the general shape of an ellipse with said oppositely disposed lobes forming the major axis of said ellipse, the axis of said passage in said valve member being coaxial with the minor axis of the ellipse and perpendicular to the major axis thereof, the cross-section of said cavity also having the general shape of an ellipse, said oppositely disposed recesses forming the major axis of said cavity ellipse, the axes of said oppositely disposed ports being perpendicular to said major axis of the cavity ellipse.

8. A valve according to claim 7, said lobes extending lengthwise along the periphery of said valve member and said recesses extending lengthwise along said peripheral cavity wall.

9. A valve comprising a body with a valve cavity having at least three circumferentially spaced ports in the peripheral wall thereof and a plug valve member rotatable in said cavity to control flow through said ports, said cavity wall peripherally enclosing said valve member, said valve member having at least three peripheral lobes of a resilient deformable material circumferentially spaced from each other, said cavity wall having at least two recesses circumferentially spaced from said ports and from each other and which are at least as deep as the normal relaxed height of said lobes, said valve member being rotatable in said cavity to a first position in which communication is provided between a first of said ports and a second of said ports, in which said valve member is compressed laterally between the peripheral cavity wall to squeeze one of said lobes tightly against the portion of the cavity wall surrounding a third of said ports to seal said third port and in which a second of said lobes is received in one of said recesses and is thereby relaxed, a second position, in which communication is provided between said third and second ports, in which said valve member is compressed laterally between the peripheral cavity wall to squeeze one of said lobes tightly against the portion of the cavity wall surrounding said first port to seal said first port and in which another of said lobes is received in one of said recesses and is thereby relaxed, and a third position in which said valve member is compressed laterally between the peripheral cavity wall to squeeze one of said lobes tightly against the portion of the cavity wall surrounding one of said ports to seal it and a second of said lobes against the portion of the cavity wall surrounding another of said ports to seal it so that none of said ports are in communication with each other and in which the other lobe is located in one of said recesses and is thereby relaxed.

10. A valve according to claim 9, in which in said first position of said valve member, the third of said lobes is received in the other recess.

11. A valve according to claim 9, said cavity wall forming a bearing for said rotation of said valve member.

12. A valve according to claim 11, said valve member being made of said resilient deformable material.

13. A valve according to claim 12, said deformable material forming said valve member having a rigid stem embedded therein.

14. A valve according to claim 11, said valve member and cavity both being generally cylindrical in shape with said lobes protruding from the cylindrical periphery of the valve member and extending longitudinally along said periphery and said recesses extending longitudinally along the cylindrical wall of said cavity.

15. A valve according to claim 14, each of said lobes having an arcuate periphery and each of said recesses having an arcuate floor, the width and length of each recess being at least as great as the width and length of each lobe.

16. A valve according to claim 15, the arc of the periphery of each lobe of said three lobes intersecting the arc of an adjacent lobe.

17. A valve according to claim 9, said valve member having a peripheral slot spaced from the ends thereof to provide said communication between said ports.

18. A valve according to claim 9, said cavity wall having a third recess therein, located so that in each of said first and second positions two of said lobes are received in two of said recesses, said lobes extending longitudinally of the periphery of said valve member but terminating short of an end thereof, said recesses extending longitudinally of the peripheral cavity wall but terminating short of an end thereof corresponding to said end of said valve member.

19. A valve comprising a body with a valve cavity having at least one inlet port and at least one outlet port spaced from each other with at least one of said ports being in the peripheral wall of said cavity and a plug valve member rotatable in said cavity to open and close flow from said inlet port through said valve to said outlet port, said cavity wall peripherally enclosing said valve member, said valve member having at least one peripheral lobe of a deformable resilient material, said peripheral wall of said cavity having a recess which is peripherally spaced from said port in said cavity wall and which is at least as deep as the normal relaxed height of said lobe, said valve being rotatable from a first position, in which it is compressed laterally between the peripheral cavity wall with the lobe squeezed tightly under compression against the cavity wall portion around the periphery of said port in said wall to provide a seal, and to a second position, in which said lobe is located in said recess and is thereby relaxed to facilitate rotation of the valve member in the cavity, said valve member and cavity both being generally cylindrical in shape with said lobe protruding from the cylindrical periphery of the valve member and said recess recessed in the cylindrical cavity wall, whereby said port is located in a cylindrical portion of said cavity wall circumferentially spaced from said recess therein, the circumferential width of said lobe and the length thereof in a direction parallel to the center axis of the valve member being substantially greater than the diameter of said port.

20. A valve according to claim 19, the floor of said recess and the periphery of said lobe both being arcuate, the circumferential width of the cylindrical portion of the cavity wall in which said port is located being about the same as the circumferential width of said lobe, the circumferential distance between the circumferential center of said recess and the center axis of said port being about the same as the circumferential widths of said lobe and cylindrical wall cavity portion, the circumferential width of said recess being at least as large as the circumferential width of said lobe, the length of said recess in a direction parallel to the center axis of the cavity being at least as great as the corresponding length of said lobe, whereby the sealing area between said lobe and cylindrical cavity portion in said first position of said valve member extends along the circumferential width of said cylindrical cavity portion and whereby when movement of said valve member from said first position to said second position is commenced relief of said lobe by movement thereof into said recess is commenced.

21. A valve according to claim 20, said recess and lobe being elongated in the direction of the center axes of said cavity and valve member.

22. A valve according to claim 19, in which said cylindrical cavity wall has at least two of said recesses spaced circumferentially on either side of said port in said cavity wall, the circumferential width of said lobe being about the same as the circumferential width of the cylindrical portion of said cavity wall between said recesses and in which said port is located.

23. A valve according to claim 22, the circumferential widths and lengths, in a direction parallel to the cavity center axis, of said recesses being at least as great as the circumferential width and length in said direction, respectively, of said lobe.

24. A valve according to claim 23, in which said recesses and lobe are arcuate and are elongated in said direction.

References Cited

UNITED STATES PATENTS

| | | | |
|---|---|---|---|
| 2,872,944 | 2/1959 | Ludwig | 137—625.47 |
| 2,963,263 | 12/1960 | Sanctuary | 251—315X |
| 3,214,133 | 10/1965 | Rodgers et al. | 251—315X |
| 3,254,872 | 6/1966 | Roos | 251—317X |
| 3,223,111 | 12/1965 | Anderson | 251—317X |
| 3,244,398 | 4/1966 | Scaramucci | 251—317X |
| 3,314,645 | 4/1967 | Temple | 251—317 |
| 3,467,356 | 9/1969 | Mueller | 251—314X |

ARNOLD ROSENTHAL, Primary Examiner

U.S. Cl. X.R.

251—317, 314, 192